(12) United States Patent
Wu (10) Patent No.: US 10,440,763 B2
(45) Date of Patent: Oct. 8, 2019

(54) M2M NODE DELETION AND REGISTRATION METHOD, M2M NODE AND STORAGE MEDIUM

(71) Applicant: ZTE Corporation, Shenzhen, Guangdong (CN)

(72) Inventor: Hao Wu, Shenzhen (CN)

(73) Assignee: ZTE CORPORATION (CN)

( * ) Notice: Subject to any disclaimer, the term of this patent is extended or adjusted under 35 U.S.C. 154(b) by 68 days.

(21) Appl. No.: 15/523,070

(22) PCT Filed: Apr. 3, 2015

(86) PCT No.: PCT/CN2015/075907
§ 371 (c)(1),
(2) Date: Apr. 28, 2017

(87) PCT Pub. No.: WO2016/070565
PCT Pub. Date: May 12, 2016

(65) Prior Publication Data
US 2017/0332426 A1   Nov. 16, 2017

(30) Foreign Application Priority Data
Nov. 4, 2014   (CN) .......................... 2014 1 0613868

(51) Int. Cl.
*H04W 76/14* (2018.01)
*H04W 60/00* (2009.01)
(Continued)

(52) U.S. Cl.
CPC ............. *H04W 76/14* (2018.02); *H04W 4/70* (2018.02); *H04W 60/00* (2013.01); *H04W 60/06* (2013.01); *H04W 8/18* (2013.01)

(58) Field of Classification Search
CPC ....... H04W 4/70; H04W 60/00; H04W 60/06; H04W 76/10; H04W 76/14; H04W 88/18; H04W 8/18
(Continued)

(56) References Cited

U.S. PATENT DOCUMENTS

2013/0343231 A1* 12/2013 Foti ..................... H04L 12/1407
370/259
2014/0286284 A1* 9/2014 Lim ....................... H04W 76/14
370/329
(Continued)

FOREIGN PATENT DOCUMENTS

CN   103220670 A   7/2013
CN   103796300 A   5/2014
(Continued)

OTHER PUBLICATIONS

International Search Report in international application No. PCT/CN2015/075907, dated Jul. 30, 2015, 2 pgs.
(Continued)

*Primary Examiner* — Rownak Islam
(74) *Attorney, Agent, or Firm* — McDonald Hopkins LLC (57) ABSTRACT

The disclosure discloses a Machine to Machine (M2M) node deletion and registration method and an M2M node. The deleting method includes: a receiving step: receiving a node deleting request for a first M2M node; and a responding step: in response to the node deleting request, deleting a node resource of the first M2M node, and reserving a physical resource corresponding to the first M2M node, the physical resource including at least one of an Application Entity (AE) resource and a Common Service Entity (CSE) resource. Embodiments of the disclosure also provide a computer storage medium.

14 Claims, 4 Drawing Sheets

(51) Int. Cl.
*H04W 60/06* (2009.01)
*H04W 4/70* (2018.01)
*H04W 8/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2014/0351403 A1 | 11/2014 | Lin et al. | |
| 2016/0007137 A1 | 1/2016 | Ahn et al. | |
| 2016/0057795 A1* | 2/2016 | Kim | H04W 76/14 370/329 |
| 2016/0113060 A1* | 4/2016 | Cho | H04W 4/70 370/338 |
| 2016/0294886 A1 | 10/2016 | Wu | |
| 2016/0302069 A1* | 10/2016 | Kim | H04L 9/32 |

FOREIGN PATENT DOCUMENTS

| | | |
|---|---|---|
| EP | 2961122 A1 | 12/2015 |
| EP | 3060018 A1 | 8/2016 |
| WO | 2014129802 A1 | 8/2014 |
| WO | 2014169804 A1 | 10/2014 |

OTHER PUBLICATIONS

English Translation of the Written Opinion of the International Search Authority in international application No. PCT/CN2015/075907, dated Jul. 30, 2015, 5 pgs.

Supplementary European Search Report in European application No. 15856893.1, dated Sep. 1, 2017, 8 pgs.

"oneM2M Functional Architecture", Nov. 2013, Rajesh Bhalla et al., ONEM2M-TS-0001- FUNCTIONAL_ARCHITECTUR-V0_2_2.ZIP, ONEM2M, vol. Work Programme, Work Progr, No. version = v0.2.2 14, XP084003946, Retrieved from the Internet: URL:URL = http://member.onem2m.org/Application/ documentapp/downloadimmediate/default.aspx?docID=3904 [retrieved on Nov. 14, 2013], pp. 1-110.

* cited by examiner

M2M NODE DELETION AND REGISTRATION METHOD, M2M NODE AND STORAGE MEDIUM

TECHNICAL FIELD

The disclosure relates to a Machine Type Communication (MTC) terminal in communications, and in particular to a Machine to Machine (M2M) node deletion and registration method, an M2M node and a storage medium.

BACKGROUND

Figure 1:
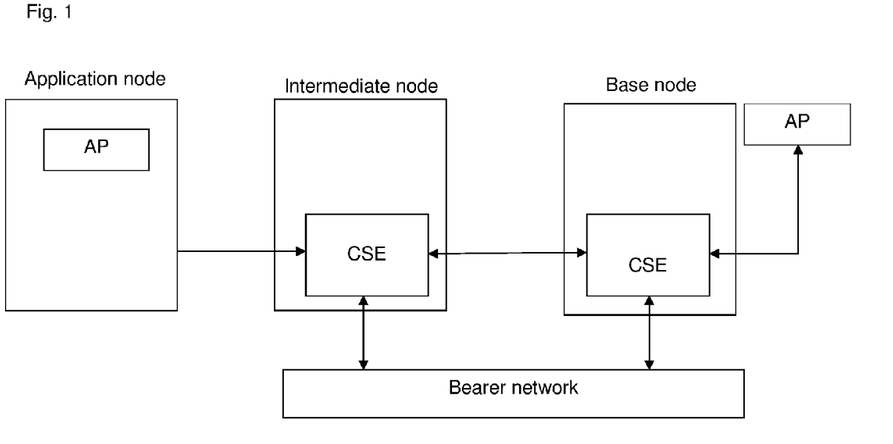
FIG. 1 is a structural diagram of an M2M communication system.

FIG. 1 shows an M2M communication system. The system includes a bearer network and M2M nodes communicating via the bearer network. The M2M nodes include an application node, an intermediate node and a base node. The M2M nodes communicate with each other via the bearer network, each M2M node including, at least, an Application Entity (AE) or a Common Service Entity (CSE).

The AE is a logic unit for executing an actual M2M application, and the CSE is a logic unit for managing and serving the application. The communication between M2M applications is information interaction via the CSEs. The M2M applications are registered onto the CSEs, the CSEs also need to be registered onto each other, and interaction between the M2M applications can be implemented via the communication between the CSEs.

The application node is an executive node at a tail end such as a smart electric meter, a temperature measurement and control sensor, a fire alarm and a smart home appliance, etc. The intermediate node is middleware connecting the executive node at the tail end to a network-side server, such as a gateway. The base node is the network-side server. An application registered onto the base node may be a management platform of an M2M service provider.

In FIG. 1, an AE on an application node is registered onto a CSE on an intermediate node, so the CSE on the intermediate node is called as a local CSE or a registering CSE of the AE on the application node. Similarly, the CSE on the intermediate node is registered onto a CSE on a base node, and the CSE on the base node is called as a local CSE or a registering CSE of the CSE on the intermediate node.

It is found, in the conventional art, that when an M2M node is re-registered onto a registering CSE thereof after being deleted due to failure or other reasons, data of an AE and a CSE on the M2M node stored on the registering CSE thereof is lost, thus resulting in data loss after the failure of the M2M node are removed.

SUMMARY

In view of this, embodiments of the disclosure are intended to provide an M2M node deletion and registration method, an M2M node, and a storage medium, for avoiding the problem of loss of data stored on a local CSE of an M2M node after the M2M node is deleted.

The technical solutions of the embodiments of the disclosure are implemented as follows.

According to a first aspect in the embodiments of the disclosure, a method for deleting a M2M node is provided, the method may include: a receiving step: receiving a node deletion request for a first M2M node, and a responding step: in response to the node deletion request, deleting a node resource of the first M2M node, and reserving a physical resource corresponding to the first M2M node, the physical resource including at least one of an Application Entity (AE) resource and a Common Service Entity (CSE) resource.

Alternatively, after the responding step, the method may further include a timing step, the timing step includes: initiating a timer to time a reserving duration, stopping timing of the timer when a new node resource address is added into an attribute of the physical resource. Otherwise, continuing timing until the timer expires. After the timer expires, deleting the physical resource.

According to a second aspect in the embodiments of the disclosure, a method for deleting a M2M node is provided, the method may include the following steps: a node deletion request for a first M2M node is received; a node resource of the first M2M node is deleted in response to the node deletion request, and data on a physical resource corresponding to the first M2M node is stored. Herein the physical resource includes at least one of an AE resource and a CSE resource.

Alternatively, the step that data on a physical resource corresponding to the first M2M node is stored may include that: the physical resource is reserved, so as to reserve data stored on the physical resource.

Alternatively, the method may further include the following steps: a time duration within which the physical resource is not associated with the node resource is timed to form a storage duration; when the storage duration reaches a specified time duration, the physical resource is deleted.

Alternatively, the step that data on a physical resource corresponding to the first M2M node is stored may include that: data on the physical resource is extracted; the data is stored; and the physical resource is deleted.

According to a third aspect in the embodiments of the disclosure, a method for registering a M2M node is provided, the method may include the following steps: a registration request for a second M2M node is received, the registration request including a node identifier, the registration request further including a physical identifier, and the physical identifier including at least one of an AE identifier and a CSE identifier; a node resource is created for the second M2M node according to the node identifier; it is queried, according to the physical identifier, whether a physical resource associated with the physical identifier is stored; if a physical resource associated with the physical identifier is stored, an address of the node resource is stored as an attribute of the physical resource.

Alternatively, the step that it is queried whether a physical resource associated with the physical identifier is stored according to the physical identifier may include at least one of the steps that: it is queried, according to the AE identifier in the registration request, whether a physical identifier of an AE resource is identical to the AE identifier; and it is queried, according to the CSE identifier in the registration request, whether a physical identifier of a CSE resource is identical to the CSE identifier.

According to a fourth aspect in the embodiments of the disclosure, a method for registering a M2M node is provided, the method may include the following steps: a registration request for a second M2M node is received, the registration request including a node identifier, the registration request further including a physical identifier, and the physical identifier including at least one of an AE identifier and a CSE identifier; a node resource is allocated for the second M2M node according to the node identifier; it is queried, according to the physical identifier, whether data associated with the physical identifier is stored; if data associated with the physical identifier is stored, the data is stored in a first physical resource corresponding to the physical identifier.

Alternatively, when the data is stored in a second physical resource and a physical identifier of the second physical resource is identical to a physical identifier carried in the registration request, the step that the data is stored in a first physical resource corresponding to the physical identifier may include that: when the second physical resource is a physical resource which has been registered according to the physical identifier, the node resource is associated with the second physical resource; the second physical resource being the first physical resource which has been registered according to the physical identifier.

Alternatively, the step that the data is stored in a first physical resource corresponding to the physical identifier may include that: a first physical resource is created according to the physical identifier; and the data is stored in the first physical resource.

According to a fifth aspect in the embodiments of the disclosure, an M2M node is provided. The M2M node may include: a receiving unit, arranged to receive a node deleting request for a first M2M node; and a responding unit, arranged to delete, in response to the node deleting request, a node resource of the first M2M node, reserve a physical resource corresponding to the first M2M node, and the physical resource includes at least one of an AE resource and a CSE resource.

Alternatively, the M2M node may further include a timing unit, the timing unit is arranged to: initiate, after the node resource is deleted, a timer to time a reserving duration; stop timing of the timer when a new node resource address is added into an attribute of the physical resource; otherwise, continue timing until the timer expires. The responding unit may be further arranged to delete the physical resource after the timer expires.

According to a sixth aspect in the embodiments of the disclosure, an M2M node is provided. The M2M node may include: a receiving unit, arranged to receive a node deleting request for a first M2M node; and a responding unit, arranged to delete, in response to the node deleting request, a node resource of the first M2M node, and store data on a physical resource corresponding to the first M2M node, the physical resource comprising at least one of an Application Entity (AE) resource and a Common Service Entity (CSE) resource.

Alternatively, the responding unit may be arranged to reserve the physical resource, so as to reserve data stored on the physical resource.

Alternatively, the M2M node may further include: a timing unit, arranged to time a time duration within which the physical resource is not associated with the node resource, so as to form a storage duration; and a deleting unit, arranged to delete, when the storage duration reaches a specified time duration, the physical resource.

Alternatively, the responding node may be arranged to extract data on the physical resource and store the data; and the M2M node may further include a deleting unit for deleting the physical resource.

According to a seventh aspect in the embodiments of the disclosure, an M2M node is provided. The M2M node may include: a receiving unit, arranged to receive a registration request for a second M2M node, the registration request including a node identifier, the registration request further including a physical identifier, and the physical identifier including at least one of an AE identifier and a CSE identifier; an allocating unit, arranged to allocate a node resource for the second M2M node according to the node identifier; a querying unit, arranged to query, according to the physical identifier, whether a physical resource associated with the physical identifier exists; and a control unit, arranged to store, when the physical resource associated with the physical identifier exists, an address of the node resource as an attribute of the physical resource.

Alternatively, the querying unit may be arranged to: query, according to the AE identifier in the registration request, whether a physical identifier of an AE resource is identical to the AE identifier; and/or query, according to the CSE identifier in the registration request, whether a physical identifier of a CSE resource is identical to the CSE identifier.

According to an eighth aspect in the embodiments of the disclosure, an M2M node is provided. The M2M node may include: a receiving unit, arranged to receive a registration request for a second M2M node, the registration request including a node identifier, the registration request further including a physical identifier, and the physical identifier including at least one of an AE identifier and a CSE identifier; an allocating unit, arranged to allocate a node resource for the second M2M node according to the node identifier; a querying unit, arranged to query, according to the physical identifier, whether data associated with the physical identifier is stored; and a control unit, arranged to store, when the data associated with the physical identifier is stored, the data in a first physical resource corresponding to the physical identifier.

Alternatively, the control unit may be arranged to associate, when the data is stored in a second physical resource and a physical identifier of the second physical resource is identical to a physical identifier carried in the registration request, the node resource with the second physical resource, the second physical resource being identical to the first physical resource.

Alternatively, the control unit may be further arranged to control the allocating unit to create a first physical resource according to the physical identifier, and store the data in the first physical resource.

The embodiments of the disclosure also provide a computer storage medium. A computer-executable instruction may be stored in the computer storage medium. The computer-executable instruction may be used for executing at least one of the abovementioned methods.

According to the M2M node deletion and registration method, the M2M node and the storage medium in the embodiments of the disclosure, when a first M2M node is deleted, a node resource of the first M2M node is deleted, a physical resource of the first M2M node is reserved or data of an AE and/or a CSE of the first M2M node is stored. Thus, after the first M2M node is maintained or the M2M node is replaced, data generated before the first M2M node is replaced may be found again in case of keeping an original AE and CSE unchanged, thereby solving the problem of loss of data stored physically on a local CSE of a corresponding M2M node after the M2M node is deleted in the conventional art.

DETAILED DESCRIPTION

The technical solutions of the disclosure will be further elaborated in detail hereinbelow in conjunction with the drawings of the description and specific embodiments. It should be understood that preferred embodiments illustrated hereinbelow are only intended to illustrate and explain the disclosure and are not thus limitative of the disclosure.

According to the M2M node deleting method in the embodiments of the present application, when an M2M node is to be deleted, a physical resource of the M2M node to be deleted is reserved or data on the M2M node to be deleted is stored, so deletion of data stored on the M2M node can be avoided. Thus, when the M2M node is deleted subsequently, the replaced M2M node can utilize data of the M2M node deleted previously, thereby reducing various problems resulted from data loss.

Figure 2:
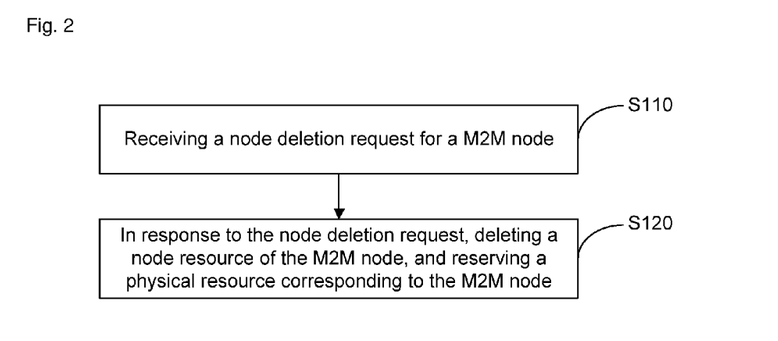
FIG. 2 is a first flowchart of an M2M deleting method according to an embodiment of the disclosure.

Method Embodiment One:

As shown in FIG. 2, the present embodiment provides an M2M node deleting method, which includes:

a receiving step S110: receiving a node deleting request for a first M2M node; and a responding step S120: in response to the node deleting request, deleting a node resource of the first M2M node, and reserving a physical resource corresponding to the first M2M node.

Herein, the physical resource includes at least one of an AE resource and a CSE resource.

During the node deletion method in the present embodiment, since the physical resource is reserved, it is obvious that data in the physical resource can be stored, and it is also obvious that the problem of loss of data stored in the physical resource is avoided.

After the responding step, the method further includes a timing step, the timing step includes: initiating a timer to time reserving time, stopping timing of the timer when a new node resource address is added into an attribute of the physical resource, otherwise, continuing timing until the timer expires; and after the timer expires, deleting the physical resource.

The timer is a timer for timing a reserving duration.

The timer is arranged to perform timing for a physical resource not associated with a node resource, when a specified time duration is reached (specifically, for example, the timer expires), it is regarded that the physical resource may be deleted, thus preventing a great number of physical resources from being in an idle state so as to improve the usage efficiency of the physical resources. A failure time duration of the timer is the specified time duration, and may be preset according to different physical resources and parameters such as importance of data of an AE or a CSE.

Figure 3:
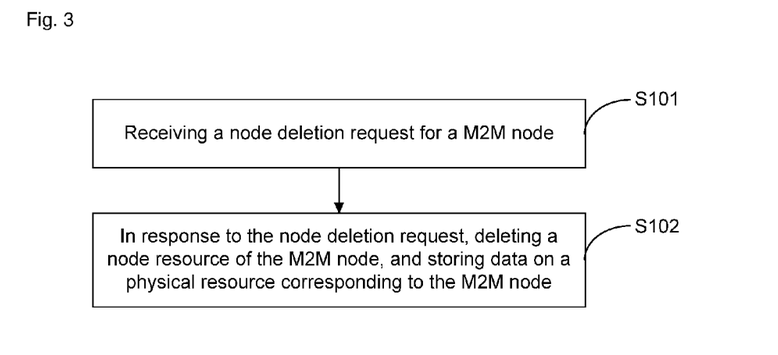
FIG. 3 is a second flowchart of an M2M deleting method according to an embodiment of the disclosure.

Method Embodiment Two:

As shown in FIG. 3, the present embodiment provides an M2M node deleting method, which includes the following steps.

At step S101, a node deleting request for a first M2M node is received.

At step S102, in response to the node deleting request, a node resource of the first M2M node is deleted, and data on a physical resource corresponding to the first M2M node is stored.

Herein, the physical resource includes at least one of an AE resource and a CSE resource.

In the conventional art, when an M2M node is deleted, a node resource and a physical resource of the M2M node are synchronously deleted, thus resulting in loss of data in the physical resource. When the M2M node is re-registered onto a registering CSE, the registering CSE does not have any data physically stored on the M2M node, thus resulting in loss of the previous data.

Specifically, for example, a monitoring application runs on a camera installed at a place A. The camera is the first M2M node, and the monitoring application is the AE. The camera is connected and registered, via a bearer network, to a storage server located at a place B. The storage server is a registering CSE of the camera. The storage server allocates a node resource for the camera, and stores information of the whole node. The storage server further allocates an application resource for the monitoring application on the camera. The application resource is used for storing monitoring data.

If the camera is faulty or suffers from other problems, a phenomenon of node alternation will occur, and the camera is taken from an installation place for maintenance, thus avoiding resource waste of the storage server. A deleting process of the first M2M node will be carried out usually. It is observed that when the first M2M node is deleted in the conventional art, the node resource and the application resource are deleted and monitoring data stored on the application resource will be deleted apparently along with the deletion of the application resource. When the camera is re-connected to a registered node thereof after being repaired, the camera will not obtain the previous monitoring data, thus resulting in loss of the monitoring data. By adopting the method in the present embodiment, the above problem can be avoided. In the disclosure, data on the physical resource will be stored, thus contributing to acquisition of data generated by running of the AE or CSE on the first M2M node or data submitted to the registering CSE when the first M2M node is re-connected to the registering CSE thereof next time.

There are many data storage modes, two of which are provided hereinbelow.

First: Step S102 includes that: the physical resource is reserved, so as to reserve data stored on the physical resource.

The method reserves the physical resource, and does not delete the physical resource. The data stored on the physical resource is saved apparently, and data loss can be avoided similarly.

Second: Step S102 includes that: data on the physical resource is extracted, the data is compressed and stored, and the physical resource is deleted.

The data on the physical resource is copied, compressed and stored, and meanwhile, in order to respond to a deleting request and improve the resource utilization rate of a registering CSE node, the physical resource will also be deleted.

In a specific implementation process, the data may be directly stored without being compressed. The data compression is intended to briefly describe the data volume, in order to reduce the volume of data stored on the registering CSE.

In a specific implementation process, an AE resource allocated for the AE by the registering CSE or a CSE resource allocated for the CSE will not be in a full-load state usually. So, even if the data is stored without being compressed, the aim of saving part of resources of the registering CSE can be achieved as well.

If data formed by the AE or the CSE on the first M2M node is stored by using the first method, when the first M2M node is re-registered to the registering CSE, the registering CSE does not need to allocate the physical resource. If the data formed by the AE or the CSE on the first M2M node is stored by using the second method, the registering CSE needs to re-allocate the physical resource.

Figure 4:
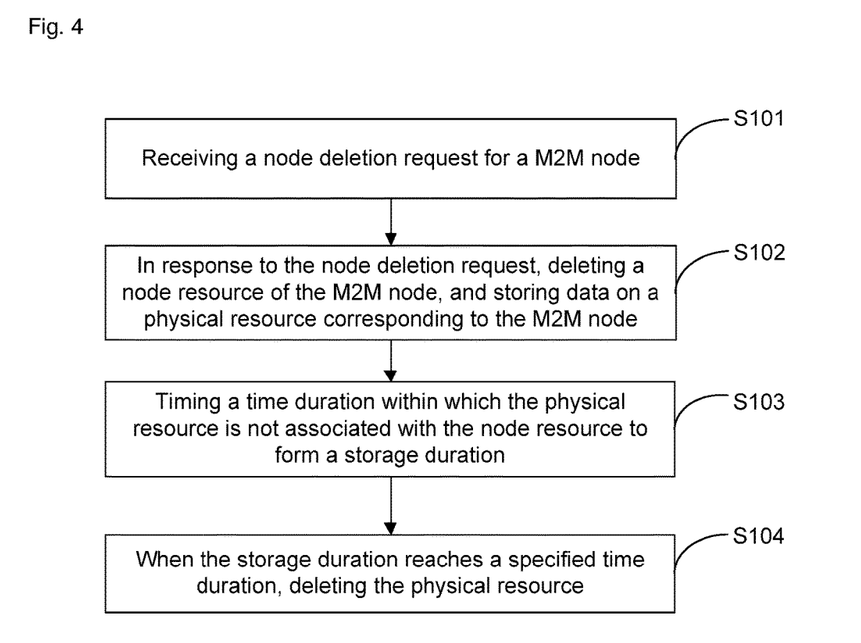
FIG. 4 is a third flowchart of an M2M deleting method according to an embodiment of the disclosure.

As shown in FIG. 4, on the basis of the second method, the present embodiment performs further improvement.

The method further includes the following steps.

At step S103, a time duration within which the physical resource is not associated with the node resource is timed to form a storage duration.

At step S104, when the storage duration reaches a specified time duration, the physical resource is deleted.

In order to prevent some first M2M nodes from being permanently deleted, if the physical resource is stored therefor for a long time, the problem of low resource utilization rate of the registering CSE will be caused. So, in the present embodiment, a time duration within which the registered physical resource is not associated with the node resource is measured, and if a specified time duration is reached, the AE resource or the CSE resource will be deleted, thus improving the resource utilization rate of the registering CSE.

Specifically, for example, a resource of a monitoring application A in the camera has been reserved in the registering CSE for a specified time duration, such as a month, there is no new camera node resource associated therewith yet. It is shown that the physical resource is still in an idle state, a time duration during which the M2M node is not used has reached a specified time duration. In order to improve the resource usage efficiency of the registering CSE, the physical resource may be deleted.

It is important to note that deletion of the physical resource in the present embodiment does not refer to removal of this resource from the registering CSE, but refers to that the physical resource cannot be reused with respect to the first M2M node, which is equivalent to delete the physical resource for the first M2M. The registering CSE deletes the physical resource, i.e., uses the physical resource for other purposes.

In conclusion, according to the M2M node deleting method of the present embodiment, the node resource will be deleted whilst data on the physical resource is stored or the physical resource is directly stored. Thus, the data formed previously can be prevented from being utilized when an AE or a CSE is re-registered onto a corresponding registering CSE subsequently, so as to avoid data loss.

Figure 5:
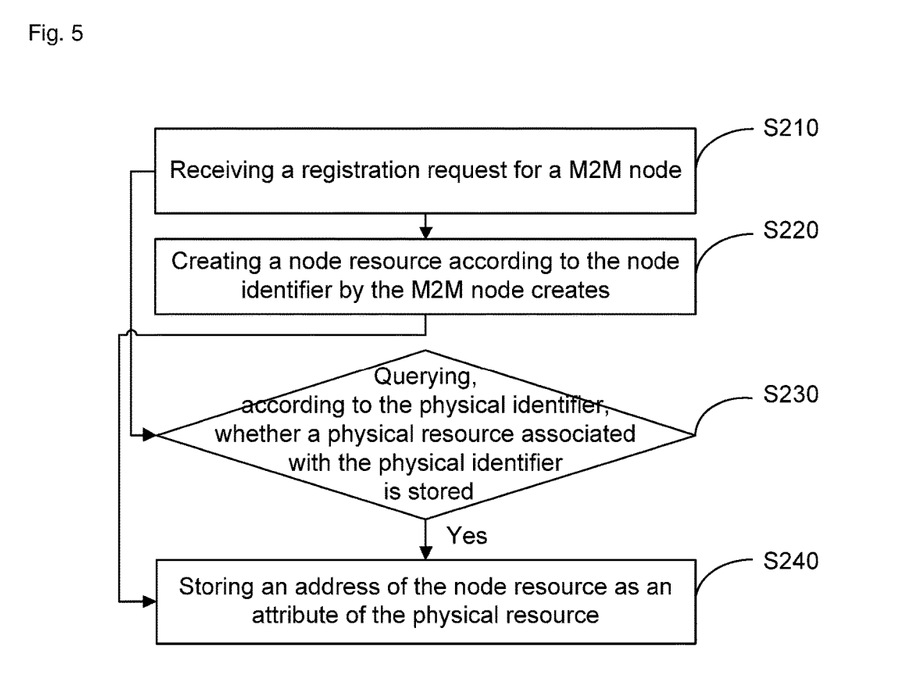
FIG. 5 is a first flowchart of an M2M registering method according to an embodiment of the disclosure.

Specifically, as shown in FIG. 5, the present embodiment provides an M2M node registering method, which may further include the following steps.

At step S210, a registration request for a second M2M node is received, the registration request including a node identifier, the registration request further including a physical identifier, and the physical identifier including at least one of an AE identifier and a CSE identifier.

At step S220, the second M2M node creates a node resource according to the node identifier.

At step S230, it is queried whether a physical resource associated with the physical identifier is stored according to the physical identifier. If so, step S240 is executed.

At step S240, an address of the node resource is stored as an attribute of the physical resource.

The method of the present embodiment is correspondingly set on the basis of the M2M node deleting method in method embodiment 1. Since the deleted physical resource of the previous M2M node is reserved during alternation of M2M nodes and a new M2M node uses a physical resource identical to that of the previous M2M node, so only a node resource may be created when a new M2M node is registered, and the reserved physical resource is associated with the node resource. In the present embodiment, when the physical resource and the node resource are associated, an address of the node resource is directly stored as an attribute of the physical resource, that is, the attribute of the physical resource is updated, thus facilitating subsequent usage. In the present embodiment, when the physical resource and the node resource are associated, a mapping relationship table between the physical resource and the node resource may also be established, or the address of the physical resource is added into the attribute of the physical resource.

Step S230 may include at least one of the following:

it is queried whether a physical identifier of an AE resource is identical to the AE identifier according to the AE identifier in the registration request; and it is queried whether a physical identifier of a CSE resource is identical to the CSE identifier according to the CSE identifier in the registration request.

During specific implementation, step S220 and step S230 are executed with no particular order, and it is only required that step S220 and step S230 are executed before step S240.

Herein, if the physical resource associated with the physical identifier is not queried in step S230, the method also reserves the step of creating the physical resource for the second M2M node according to the physical resource.

During specific implementation, the physical resource is associated with the node resource. In addition to storage of the address of the node resource as the attribute of the physical resource, a mapping table including the physical resource and the node resource may also be established.

Figure 6:
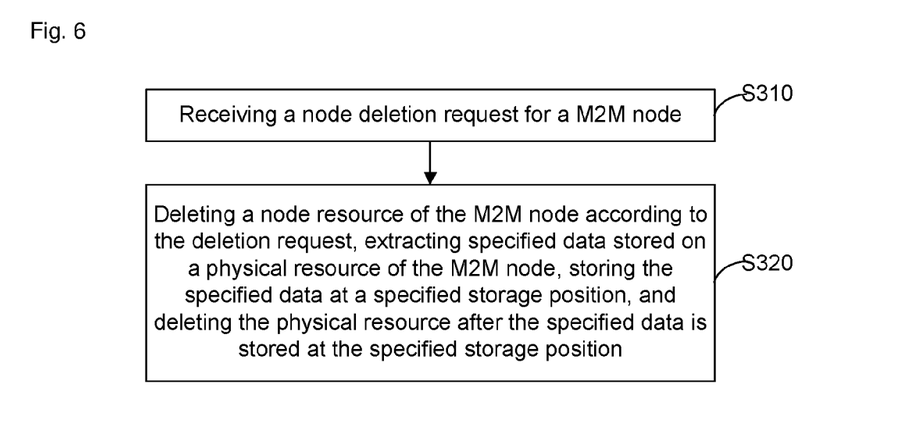
FIG. 6 is a second flowchart of an M2M registering method according to an embodiment of the disclosure.

Method Embodiment Three:

As shown in FIG. 6, the present embodiment provides an M2M node deleting method, which includes the following steps.

At step S310, a node deleting request of a first M2M node is received.

At step S320, a node resource of the first M2M node is deleted according to the deleting request, specified data stored on a physical resource of the first M2M node is extracted, the specified data is stored at a specified storage position, and the physical resource is deleted after the specified data is stored at the specified storage position.

The physical resource includes at least one of an AE resource and a CSE resource.

According to the method of the present embodiment, before the physical resource is deleted, specified data on the physical resource is extracted first. Specifically, for example, information such as a monitoring video for monitoring an M2M node is stored at a specified position such as a database for backing up deleted physical resource data. Thus, apparently, the problem of loss of data stored on the physical resource after the M2M node is deleted can be avoided.

Further, in order to prevent a large volume of data to be saved as specified data, storing the specified data at the specified position includes: compressing the specified data; and storing the compressed specified data at the specified position. Sequentially executing compression and storage can effectively save storage resources.

Figure 7:
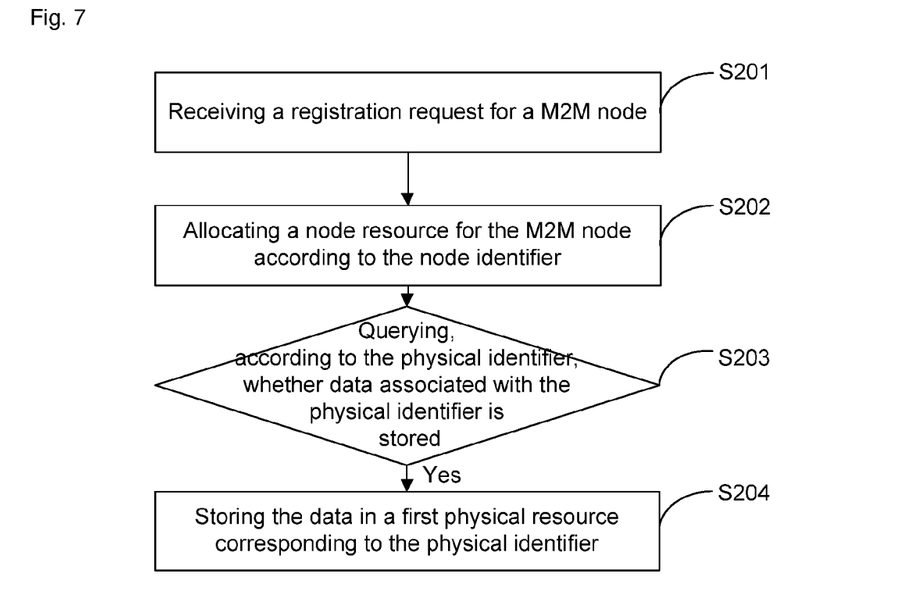
FIG. 7 is a third flowchart of an M2M registering method according to an embodiment of the disclosure.

Method Embodiment Four:

As shown in FIG. 7, the present embodiment provides an M2M node registering method, which includes the following steps.

At step S201, a registration request for a second M2M node is received, the registration request includes a node identifier, the registration request further includes a physical identifier, and the physical identifier includes at least one of an AE identifier and a CSE identifier.

At step S202, a node resource is allocated for the second M2M node according to the node identifier.

At step S203, it is queried whether data associated with the physical identifier is stored according to the physical identifier. If so, Step S203 is executed.

At step S204, the data is stored in a first physical resource corresponding to the physical identifier.

In a specific implementation process, if a judgement result is no, the step of creating the physical resource according to the physical identifier may be directly executed.

Specifically, for example, an AE resource is created according to the AE identifier, and a CSE resource is created according to the CSE identifier.

Compared with the previous registering method, the M2M node registering method of the present embodiment adds the query step for the M2M node, therefore if an AE or a CSE is re-registered onto a corresponding registering CSE, responding historical data may be queried, thus facilitating the AE and the CSE to operate by using the historical data. Specifically, if the historical data includes control data of running the AE or the CSE, a user does not need to re-configure these data, thereby improving the usage satisfaction of the user.

Step S204 includes that: when the data is stored in a second physical resource and a physical identifier of the second physical resource is identical to a physical identifier carried in the registration request, the node resource is associated with the second physical resource, the second physical resource being identical to the first physical resource.

When the M2M node is deleted, physically corresponding data on the M2M node is retained without deleting the corresponding physical resource, so the registered second physical resource may be directly allocated for the second M2M node by serving as the first physical resource currently allocated for the AE and/or the CSE without re-creation, and it is only necessary to associate the node resource of the second M2M node with the second physical resource. Not only the data having been registered onto the AE or the CSE on the second M2M node can be retained, but also a registering response speed of the second M2M node can be increased. The second M2M node of the present embodiment may be identical to the first M2M node in method embodiment 1, or may also be different from the first M2M node.

Executive body of the M2M node deleting method in method embodiment 1 and the M2M node registering method in the present embodiment may be a registering CSE, the registering CSE being a registering CSE carried on the third M2M node.

Alternatively, step S204 may further include that: a first physical resource is created according to the physical identifier; and the data is stored in the first physical resource. The method of the present embodiment is applied to an M2M node registering method for deleting the physical resource during deletion of the M2M node but storing data in the previous physical resource.

In a specific implementation composition, an M2M node for M2M registration and deletion is received, and a database may be specially created for storing data on the physical resource corresponding to the deleted M2M node, thus facilitating query and usage of data during re-registration.

Figure 8:
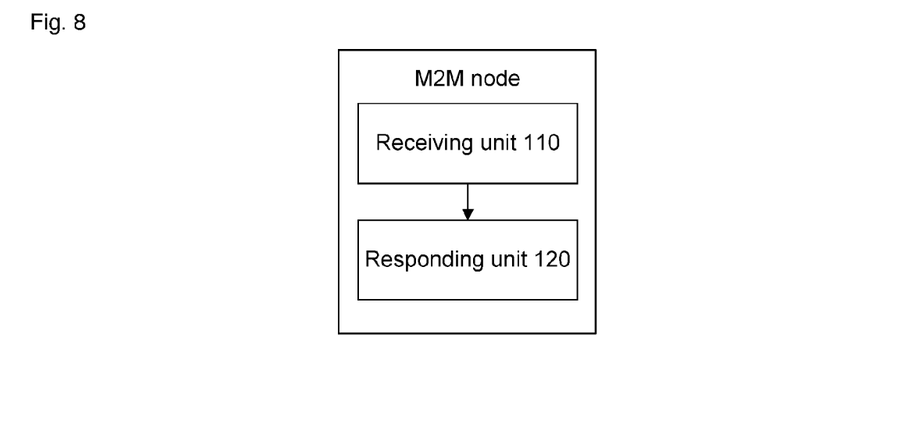
FIG. 8 is a first structural diagram of an M2M node according to an embodiment of the disclosure.

Device Embodiment One:

As shown in FIG. 8, the present embodiment provides an M2M node, which includes:

a receiving unit 110, arranged to receive a node deleting request for a first M2M node; and a responding unit 120, arranged to delete, in response to the node deleting request, a node resource of the first M2M node, and reserve a physical resource corresponding to the first M2M node.

Herein, the physical resource includes at least one of an AE resource and a CSE resource.

The receiving unit 110 may include a communication interface, or may be a wired communication interface and a wireless communication interface. The wireless communication interface includes a transmitting antenna. The wired communication interface may be a cable interface of various types such as an optical fibre interface.

A specific structure of the responding unit 120 may include processors of various types such as an Application Processor (AP), a Digital Signal Processor (DSP), a Programmable Logic Controller (PLC), a Central Processing Unit (CPU) or a Micro Control Unit (MCU). The processor is connected to the communication interface in the receiving unit via a bus.

The M2M node of the present embodiment may be a third M2M node. When the first M2M node is deleted, the physical resource corresponding to the first M2M node is reserved, so data loss caused by deletion of the physical resource of the first M2M node may be avoided.

The M2M node further includes a timing unit, the timing unit is arranged to: initiate a timer to time reserving time after the node resource is deleted; stop timing of the timer when a new node resource address is added into an attribute of the physical resource; otherwise, continue timing until the timer expires; and the responding unit 120 is further arranged to delete the physical resource after the timer expires.

The timing unit at least includes a timer. The timer may be arranged to count down a reserving duration. That is, when the timer is initiated, the reserving duration is an upper limit for a specified time duration such as 15 days. When the reserved physical resource is not associated with a new node resource for one day, the reserving duration is deducted by one day until an ending time for associating the physical resource with a new node resource expires or the timer expires.

By means of arrangement of the timing unit, the present embodiment can reduce the idle rate of the physical resource on the third M2M node.

Device Embodiment Two:

As shown in FIG. 8, the present embodiment provides an M2M node. The M2M node may be a third M2M node. The third M2M node includes: a receiving unit 110, arranged to receive a node deleting request for a first M2M node; and a responding unit 120, arranged to delete a node resource of the first M2M node in response to the node deleting request, and store data on a physical resource corresponding to the first M2M node.

Herein, the physical resource includes at least one of an AE resource and a CSE resource.

The M2M node of the present embodiment is a node including a CSE. The CSE node receives registration and deletion of other M2M nodes, and manages these nodes.

The receiving unit may include a communication interface, or may be a wired communication interface and a wireless communication interface. The wireless communication interface includes a transmitting antenna. The wired communication interface may be a cable interface of various types such as an optical fibre interface.

Alternatively, the responding unit 120 is arranged to reserve the physical resource, so as to reserve data stored on the physical resource. In the present embodiment, the data is stored by reserving the physical resource, the advantage of easy implementation is provided, and the response efficiency of re-registration can be improved.

Figure 9:
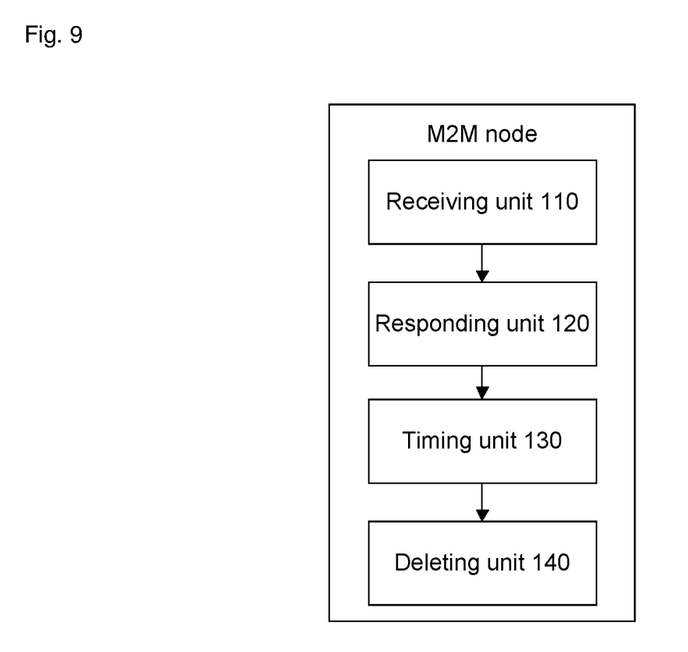
FIG. 9 is a second structural diagram of an M2M node according to an embodiment of the disclosure.

As shown in FIG. 9, the M2M node further includes: a timing unit 130, arranged to time a time duration within which the physical resource is not associated with the node resource, so as to form a storage duration; and a deleting unit 140, arranged to delete the physical resource when the storage duration reaches a specified time duration.

A specific structure of the timing unit 130 may include a timer for timing storage time.

Specific structures of the deleting unit 140 and the responding unit 120 may be processors of various types. The processors achieve functions of the deleting unit 140 and the responding unit 120 by executing predetermined instructions. The deleting unit 140 and the responding unit 120 may correspond to the same processor or different processors. When the deleting unit 140 and the responding unit 120 correspond to the same processor, the processor processes functions of different units by means of time division multiplexing or thread concurrency.

The processor may be an electronic component having a processing function such as an AP, a CPU, a DSP, an MCU or a PLC.

The responding unit 120 is arranged to extract data on the physical resource, and compress and store the data. The M2M node further includes a deleting unit for deleting the physical resource.

Specific structures of the responding unit 120 and the deleting unit may be subject to the abovementioned parts in the present embodiment, which will not be repeated. The present embodiment further limits that when deleting the M2M node, the physical resource will be deleted. But, before the physical resource is deleted, it is necessary to store data on the physical resource.

Figure 10:
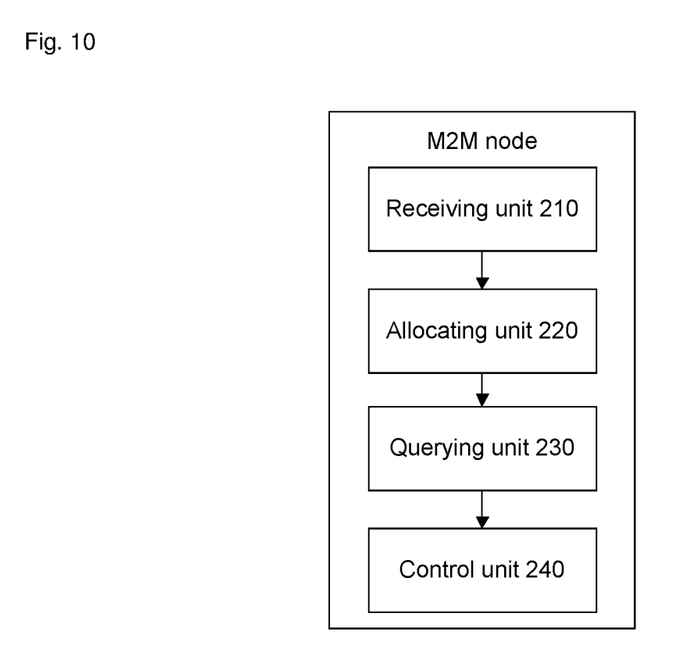
FIG. 10 is a third structural diagram of an M2M node according to an embodiment of the disclosure.

Device Embodiment Three:

As shown in FIG. 10, the present embodiment also provides an M2M node, which includes:

a receiving unit 210, arranged to receive a registration request for a second M2M node. The registration request includes a node identifier, the registration request further including a physical identifier, and the physical identifier includes at least one of an AE identifier and a CSE identifier;

an allocating unit 220, arranged to allocate a node resource for the second M2M node according to the node identifier;

a querying unit 230, arranged to query whether a physical resource associated with the physical identifier exists according to the physical identifier; and a control unit 240, arranged to store an address of the node resource as an attribute of the physical resource when the physical resource associated with the physical identifier exists.

The M2M node of the present embodiment may be a third M2M node. Since the third M2M node reserves a physical resource corresponding to the first M2M node when the first M2M node is deleted. The physical resource may be a historical physical resource running on the second M2M node, so the querying unit for querying and the control unit for storing the address of the node resource as the attribute of the physical resource are also included. During specific implementation, when a physical resource associated with the physical identifier is not queried, the allocating unit creates the physical resource according to the physical identifier.

A specific structure of the receiving unit 210 may be subject to the receiving unit 110 in the previous device embodiment, which will not be repeated herein. Specific structures of the allocating unit 220, the querying unit 230 and the control unit 240 may include processors of various types. Each processor may be an electronic component having a processing function such as an AP, an MCU, a CPU, a DSP, or a PLC.

The querying unit 230 is arranged to: query whether a physical identifier of an AE resource is identical to the AE identifier according to the AE identifier in the registration request, and/or query whether a physical identifier of a CSE resource is identical to the CSE identifier according to the CSE identifier in the registration request.

Device Embodiment Four:

As shown in FIG. 10, the present embodiment provides an M2M node. The M2M node may be a third M2M node. The third M2M node includes:

a receiving unit 210, arranged to receive a registration request for a second M2M node, the registration request includes a node identifier, the registration request further includes a physical identifier, and the physical identifier includes at least one of an AE identifier and a CSE identifier;

an allocating unit 220, arranged to allocate a node resource for the second M2M node according to the node identifier;

a querying unit 230, arranged to query whether data associated with the physical identifier is stored according to the physical identifier; and a control unit 240, arranged to store the data in a first physical resource corresponding to the physical identifier when the data associated with the physical identifier is stored.

Similarly, the M2M node of the present embodiment is a node including a registering CSE. When the M2M node in the present embodiment registers for other M2M nodes, the querying unit is included, the querying unit may be used for learning of whether an AE on a currently registered second M2M node has ever been registered before and learning of formed data, thus facilitating usage of historical data.

A specific structure of the receiving unit 210 may be subject to the receiving unit 110 in the previous device embodiment, which will not be repeated herein.

Specific structures of the allocating unit 220, the querying unit 230 and the control unit 240 may include processors of various types. Each processor may be an electronic component having a processing function such as an AP, an MCU, a CPU, a DSP, or a PLC.

On one hand, the control unit 240 may be arranged to associate the node resource with the second physical resource when the data is stored in a second physical resource and a physical identifier of the second physical resource is identical to a physical identifier carried in the registration request, and the second physical resource is identical to the first physical resource.

On the other hand, the control unit 240 is further arranged to control the allocation unit to create a first physical resource according to the physical identifier, and store the data in the first physical resource.

The control unit 240 may determine whether it is necessary to re-create a physical resource for an AE or a CSE requesting to be registered according to a current data storage position, and store data on the physical resource.

In conclusion, the present embodiment provides an M2M node for implementing the method in method embodiment 2, in order to acquire historical data before deletion and use for subsequent running when the AE or the CSE is re-registered after being deleted, thereby avoiding data loss.

The embodiments of the disclosure also provide a computer storage medium. A computer-executable instruction is stored in the computer storage medium. The computer-executable instruction is used for executing at least one of the abovementioned methods, specifically, at least one of the methods in FIG. 2 to FIG. 7.

The computer storage medium in the present embodiment may be various media capable of storing program codes such as a dynamic storage device, a Read-Only Memory (ROM), a Random Access Memory (RAM), a magnetic disk or an optical disk. In the present embodiment, the computer storage medium may be a non-instant storage medium, thus facilitating stable storage of the program codes.

Several specific examples are provided hereinbelow in conjunction with the abovementioned embodiments.

At the first step: an AE or a CSE sends a resource creating request for an own registering CSE. A request message may include the following: identifier of AE or CSE;

resource type: a value being set as a 'node'; and node identifier: set as an identifier of the node.

At the second step: After receiving the resource creating request, the registering CSE creates a node resource of a node type, and identifies the node resource with the node identifier. If the request message includes an AE identifier of the AE and it is found, by query, that the AE is registered for the first time, an AE resource is allocated for the AE directly, and is identified with the AE identifier. If the request message contains a CSE identifier of the CSE and the CSE is registered for the first time, a CSE resource is allocated for the CSE directly, and is identified with the CSE identifier.

At the third step: when the M2M node needs to be replaced, the AE or the CSE on the M2M node sends an alternation request to the registering CSE, herein the alternation request (the alternation request may be one of the abovementioned deleting requests) may include: replacement indicator: indicating that a current node is to be replaced and showing that a certain node needs to be re-registered after being deleted, address of node resource, and physical identifier (the physical identifier includes at least one of an AE identifier and a CSE identifier).

At the fourth step, after the registering CSE receives the deleting request, if the request message contains the replacement indicator, the node resource is deleted according to the address of the node resource, but the AE resource and/or CSE resource of the attribute are/is not deleted.

At the fifth step, the registering CSE stores an attribute of a node resource to form a replacement request identifier, herein the attribute of the node resource includes a physical identifier, and the physical identifier is associated with the replacement request identifier.

At the sixth step, the registering CSE receives a registering request sent by a new M2M node, the registering request including: a replacement request identifier which may be acquired by a new M2M node from an old M2M node, a resource type, a value of which is set as a 'node', and a node identifier which is set as an identifier of the node.

At the seventh step, after the registering CSE receives the resource creating request, a 'node' type and a node resource are created, a node identifier of an attribute of the node resource is set, and an AE identifier or CSE identifier in the attribute of the node resource is set according to the replacement request identifier and associated information stored in the registering CSE, thus achieving the aim of associating a non-deleted physical resource with a node resource.

Association between a physical resource and a node resource may be implemented by adding a corresponding attribute label into any one resource, or may be implemented by constructing an association table. There are many implementation modes, which will not be elaborated herein.

The foregoing descriptions are only specific implementation modes of the disclosure, and are thus not limitative of the scope of protection of the disclosure. All modifications made according to the principle of the disclosure should be interpreted as falling within the scope of protection of the disclosure.

What is claimed is:

1. A method performed by a first Machine to Machine (M2M) node for deleting and registering a M2M node, comprising:

a receiving step: receiving a node deletion request for a second M2M node;

a responding step: in response to the node deletion request, deleting a node resource of the second M2M node, and storing data on a physical resource corresponding to the second M2M node, the physical resource corresponding to the second M2M node comprising at least one of an Application Entity (AE) resource or a Common Service Entity (CSE) resource;

receiving a registration request for a third M2M node, the registration request comprising a node identifier, the registration request further comprising a physical identifier, and the physical identifier comprising at least one of an Application Entity (AE) identifier or a Common Service Entity (CSE) identifier;

allocating a node resource for the third M2M node according to the node identifier;

querying, according to the physical identifier, whether data associated with the physical identifier is stored, and if the data associated with the physical identifier is stored, storing the data associated with the physical identifier in a first physical resource corresponding to the physical identifier;

or querying, according to the physical identifier, whether a physical resource associated with the physical identifier is stored, and if the physical resource associated with the physical identifier is stored, storing an address of the node resource for the third M2M node as an attribute of the physical resource associated with the physical identifier;

wherein, after the responding step, the method further comprises a timing step, the timing step comprising:
initiating a timer to time a reserving duration;
when a new node resource address is added into an attribute of the physical resource corresponding to the second M2M node, stopping timing of the timer, and otherwise, continuing timing until the timer expires; and after the timer expires, deleting the physical resource corresponding to the second M2M node.

2. The method according to claim 1, wherein
storing data on the physical resource corresponding to the second M2M node comprises:
reserving the physical resource corresponding to the second M2M node, so as to reserve data stored on the physical resource corresponding to the second M2M node.

3. The method according to claim 2, wherein
the method further comprises:
timing a time duration within which the physical resource corresponding to the second M2M node is not associated with the node resource of the second M2M node to form a storage duration; and
when the storage duration reaches a specified time duration, deleting the physical resource corresponding to the second M2M node.

4. The method according to claim 1, wherein
storing data on the physical resource corresponding to the second M2M node comprises:
extracting data on the physical resource corresponding to the second M2M node;
storing the data; and
deleting the physical resource corresponding to the second M2M node.

5. The method according to claim 1, wherein
querying, according to the physical identifier, whether the physical resource associated with the physical identifier is stored comprises at least one of the following:
querying, according to the AE identifier in the registration request, whether a physical identifier of an AE resource is identical to the AE identifier; or
querying, according to the CSE identifier in the registration request, whether a physical identifier of a CSE resource is identical to the CSE identifier.

6. The method according to claim 1, wherein
when the data associated with the physical identifier is stored in a second physical resource and a physical identifier of the second physical resource is identical to the physical identifier carried in the registration request, storing the data associated with the physical identifier in the first physical resource corresponding to the physical identifier comprises:
when the second physical resource is a physical resource which has been registered according to the physical identifier, associating the node resource for the third M2M node with the second physical resource,
the second physical resource being the first physical resource which has been registered according to the physical identifier.

7. The method according to claim 1, wherein
storing the data associated with the physical identifier in the first physical resource corresponding to the physical identifier comprises:
creating the first physical resource according to the physical identifier; and
storing the data associated with the physical identifier in the first physical resource.

8. A first Machine to Machine (M2M) node, comprising:
a processor; and
a memory for storing instructions executed by the processor;

wherein the processor is arranged to:
receive a node deletion request for a second M2M node;
delete, in response to the node deletion request, a node resource of the second M2M node, and store data on a physical resource corresponding to the second M2M node,
the physical resource corresponding to the second M2M node comprising at least one of an Application Entity (AE) resource or a Common Service Entity (CSE) resource;
receive a registration request for a third M2M node, the registration request comprising a node identifier, the registration request further comprising a physical identifier, and the physical identifier comprising at least one of an Application Entity (AE) identifier or a Common Service Entity (CSE) identifier;
allocate a node resource for the third M2M node according to the node identifier;
query, according to the physical identifier, whether data or a physical resource associated with the physical identifier is stored; and
store, when the data associated with the physical identifier is stored, the data associated with the physical identifier in a first physical resource corresponding to the physical identifier; or store, when the physical resource associated with the physical identifier exists, an address of the node resource for the third M2M node as an attribute of the physical resource associated with the physical identifier;
wherein the processor is further arranged to
initiate, after the node resource of the second M2M node is deleted, a timer to start timing of a reserving duration; and stop, when a new node resource address is added into an attribute of the physical resource corresponding to the second M2M node, timing of the timer, and otherwise, continue timing until the timer expires; and
delete, after the timer expires, the physical resource corresponding to the second M2M node.

9. The first M2M node according to claim 8, wherein
the processor is further arranged to reserve the physical resource corresponding to the second M2M node, so as to reserve data stored on the physical resource corresponding to the second M2M node.

10. The first M2M node according to claim 9, wherein
the processor is further arranged to:
time a time duration within which the physical resource corresponding to the second M2M node is not associated with the node resource of the second M2M node, so as to form a storage duration; and
delete, when the storage duration reaches a specified time duration, the physical resource corresponding to the second M2M node.

11. The first M2M node according to claim 8, wherein
the processor is further arranged to extract data on the physical resource corresponding to the second M2M node and store the data; and
delete the physical resource corresponding to the second M2M node.

12. The first M2M node according to claim 8, wherein
the processor is further arranged to at least one of: query, according to the AE identifier in the registration request, whether a physical identifier of an AE resource is identical to the AE identifier; or query, according to the CSE identifier in the registration request, whether a physical identifier of a CSE resource is identical to the CSE identifier.

13. The first M2M node according to claim 8, wherein the processor is further arranged to associate, when the data associated with the physical identifier is stored in a second physical resource and a physical identifier of the second physical resource is identical to the physical identifier carried in the registration request, the node resource for the third M2M node with the second physical resource, the second physical resource being identical to the first physical resource.

14. The first M2M node according to claim 8, wherein the processor is further arranged to control to create the first physical resource according to the physical identifier, and store the data associated with the physical identifier in the first physical resource.

* * * * *